United States Patent [19]

Escudero

[11] Patent Number: 5,330,218
[45] Date of Patent: Jul. 19, 1994

[54] BICYCLE DRIVEN BY ALTERNATING ROWING MOVEMENT

[76] Inventor: Pablo G. Escudero, Ecuador Street, 441, 1925 Ensenada - Burenos Aires State, Argentina

[21] Appl. No.: 884,946
[22] Filed: May 18, 1992
[51] Int. Cl.⁵ .............................................. B62M 1/16
[52] U.S. Cl. .................... 280/245; 280/220; 280/244
[58] Field of Search ............... 280/244, 220, 245, 253, 280/254

[56] References Cited

U.S. PATENT DOCUMENTS

| 926,131 | 6/1909 | McGowan | 280/245 |
| 2,085,657 | 6/1937 | Heisdorf | 280/245 |
| 4,126,329 | 11/1978 | Tchernyak | 280/220 |
| 4,733,880 | 3/1988 | Wilhelm, III | 280/244 X |
| 4,861,055 | 8/1989 | Jones | 280/245 X |
| 5,007,655 | 4/1991 | Hanna | 280/245 X |

FOREIGN PATENT DOCUMENTS

| 2458110 | 7/1976 | Fed. Rep. of Germany | 280/244 |
| 456498 | 11/1936 | United Kingdom | 280/244 |

Primary Examiner—Margaret A. Focarino
Assistant Examiner—C. Mattix
Attorney, Agent, or Firm—Edmund M. Jaskiewicz

[57] ABSTRACT

Bicycle driven by alternating rowing movement which utilizes conventional frame, brakes, steering and fittings and having as distinctive feature axially articulated steering handles which act as a lever producing axial and alternating (rowing) movements. The lower end of the lever is connected to a device which turns the alternating movement into a rotating movement and which is driven by the driving flange. The movement of the steering handles-lever is connected to a sliding seat mounted on a slider affixed to the frame of the bicycle and to both footrests.

2 Claims, 1 Drawing Sheet

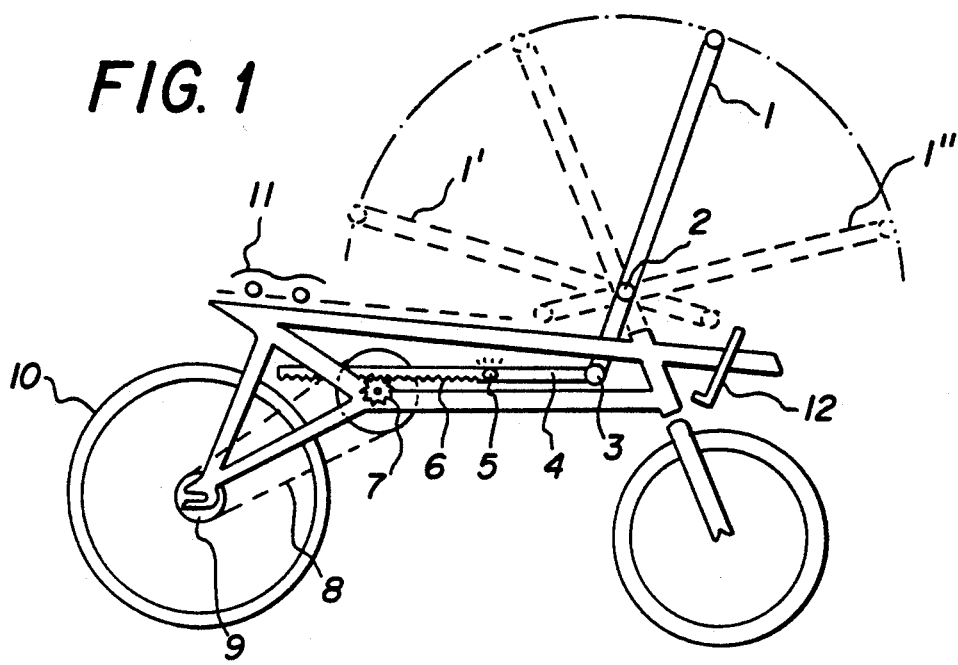
FIG. 1
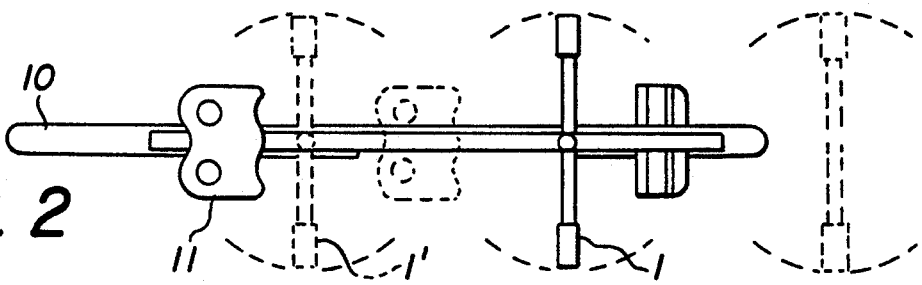
FIG. 2
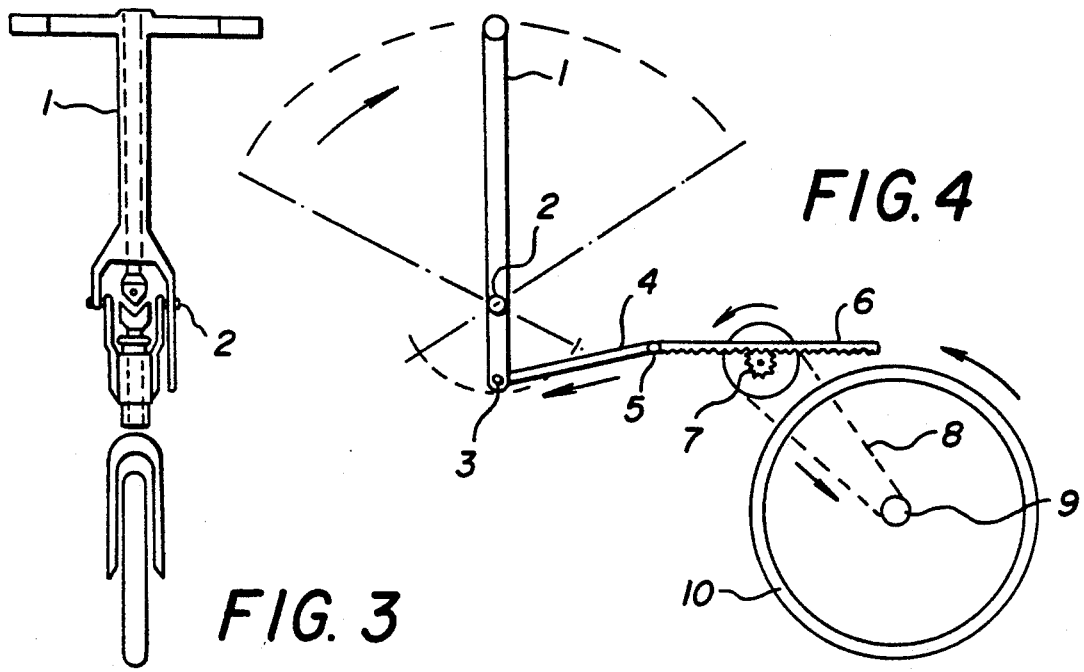
FIG. 3
FIG. 4 ns, it must emphasized, is the most important feature, and takes place at the steering handles. The steering handles generate the steering movement through an axle which goes inside the lever to the articulated yoke (steering), as in an ordinary bicycle. The difference between an ordinary bicycle and the BICIREMO is that in the BICIREMO the yoke is not fixed but articulated, thus generating the rowing movement as well.
BICYCLE DRIVEN BY ALTERNATING ROWING MOVEMENT

FIELD OF THE INVENTION

The object of the present invention, is to provide a bicycle which, instead of being propelled by the rotating movement of pedals, is propelled by the alternating movement of the steering handles turned into a rotating movement when associated to the driving wheel.

What is new and the key point about this bicycle is that it has the function and appearance of an ordinary bicycle but, and this is the difference, the driving function is accomplished by means of an alternating movement of the steering handles of the bicycle specially devised for such a function.

This alternating movement of the steering handles is axial to the frame of the bicycle and it is similar to a rowing movement.

This similarity to a rowing movement is further accomplished by a sliding seat on the frame and footrests on which the tips of the feet of the cyclist rest.

In this way, instead of pedalling in order to achieve locomotion, the cyclist performs rowing movements.

SUMMARY OF THE INVENTION

The most important characteristic or top secret of the BICIREMO lies in the place where
a) the bearing point of the lever (the oar), and
b) the BICIREMO steering, which at that point is articulated through a mechanism,
converge and act simultaneously.

That is to say, the lever accounts for the rowing—the generation of the alternating or radial movement—and at the same time it performs the steering or steering handles function, as in an ordinary bicycle. This means that the driving mechanism of the BICIREMO takes place in the front axle, which consists of the front wheel, the fork and the articulated yoke, and where a fixed support converges outside the rod or front part of the BICIREMO frame and where the lever pivots.

The effect of simultaneous rowing and steering functions, it must emphasized, is the most important feature, and takes place at the steering handles. The steering handles generate the steering movement through an axle which goes inside the lever to the articulated yoke (steering), as in an ordinary bicycle. The difference between an ordinary bicycle and the BICIREMO is that in the BICIREMO the yoke is not fixed but articulated, thus generating the rowing movement as well.

The lever (and/or steering handles and/or oar) generates the radial or alternating movement transmitting the movement to the rear wheel which plays the driving role as in an ordinary bicycle.

From the lever to the rear wheel, the movement can be transmitted through a toothed rack. But, in fact, this transmission can be accomplished by means of a connecting-rod crank device and/or open chain with spring, i.e. the driving motion transmission to the rear wheel becomes a matter of lesser importance with regard to the BICIREMO driving mechanism (two aligned wheels) since any of the three systems mentioned can be used, or any other which can turn an alternating movement into a rotating movement. In this embodiment, the toothed rack system was used because, in the preliminary tests, it proved to be the safest for the driver and it also contributes to the esthetics of the BICIREMO which is thus simplified.

It must also be emphasized that the distance covered by the steering handles (and/or lever) is the same as the distance covered by an oar handle of a race rowing boat, which is about 45.28 inches for a 5.90 feet tall person. Such distance varies according to the height of the person and the length of the lever from the bearing point. The length of the lever can be adjusted. In order to cover, with the hand fists holding the steering handles, these 45.28 inches, it is necessary to combine the work of the legs, which act as a spring, and the gluteal muscles resting on a sliding seat, which travels approximately 25.9 inches.

On the race boat the rower keeps balance in order to row, by holding the oar with his/her hands and resting his/her feet on the footrest, seated on a seat which slides driven by the action or work of the legs which make the boat move along the water at each rowing. In the BICIREMO the balance is maintained in the same way. It should be borne in mind that it has only two aligned wheels.

To keep balance when rowing the BICIREMO, a little more concentration is needed. The start is the same as with an ordinary bicycle. One foot must be placed on the footrest while the other is on the ground; two or three short rowings must be performed until balance of the BICIREMO is achieved. When it begins to move, the same as an ordinary bicycle, the BICIREMO driver must lengthen the rowing stroke to get the maximum profit of the 45.28 inches work of the lever.

The steering lever pivotally works between the legs, more precisely between the ankles and the knees, where the bearing point of the lever is located. The footrest is where the soles of the feet must be placed for the legs to be able to push strongly and also where the foot instep is held by the footholder to allow the abdominal force to take place and the BICIREMO to strike a balance. The footrest is shaped so as to allow for taking one foot or both feet at the same time out of it whenever it is needed, with a lateral movement and stepping on the ground when the BICIREMO comes to a stop.

As the seat, the steering handles, the steering rotating gantlets and the foot insteps in the footrests move, the BICIREMO driver may fear to fall down. Once this fear is overcome, the BICIREMO starts moving along driven by the rowings as if it were an ordinary bicycle (with no pedals). The balance can be maintained without difficulty and the driver of the BICIREMO starts enjoying the challenge of keeping balance rowing on a bicycle. After driving it for 10-15', the driver gets convinced that the BICIREMO can be driven as an ordinary bicycle, canting it in the turns with the body, and getting a good gripping of the feet in the footrest, as on any race rowing boat. Once the learning stage, of about 15', is accomplished, the driver will continue enjoying every rowing. According to his/her athletic condition, he/she will be able to perform 30-40 rowings per minute. Each rowing is an abdominal movement at a rate which, according to the rowing technique, can be of 30 km/hour. Being in an average athletic condition, a distance of 6 to 7 km can be covered in each session.

As on a race rowing boat, the hand fists rotate over the gantlets of the steering handles, accompanying the radial rowing to prevent hands from getting hurt, exerting force with the arms (forearms and biceps) and the shoulders. The mind is concentrated on getting good profit of the combined work of legs, arms, back, etc. in order to perform the forceful movement of the back at the right moment to transmit the greatest percent of man force to the lever, without disregarding the balance of the BICIREMO, which is accomplished by the good job of the foot heels, resting against the footrest, and the soles and insteps, which alternatively exert force against the footrest and are held by the footholders. The foot soles, the legs, etc;, work in the pushing movement of the lever. Approximately 1 second before finishing the rowing movement, the heels of the driver must be resting firmly to hold the insteps in the footholders of the footrests just when the abdominal force is performed at the end of the rowing.

Each rowing means an abdominal force, besides the work of the back, dorsal muscles, legs, heels, insteps, deltoids, arms (biceps, forearms, wrists, etc.). All these movements must be combined with a good breathing at each rowing, since the lungs demand an increasingly higher amount of oxygen.

Besides, the BICIREMO is entertaining and aerobic. It contributes to the esthetics of the person who rows it, since the rear wheel has a conventional $\phi$ of 28" for a person more than 5.08 feet tall. It has conventional bicycle brakes.

The rear wheel has an idler pinion, so only the rowing force in one sense of the alternating movement is utilized. The other movement to close the alternating of the radial movement is idle time in the BICIREMO performance. However, it works in that way to comply with the philosophy of the race rowing.

If one is to compare, the difference between a race rowing boat and the BICIREMO lies in the rowing, which is longitudinal on a boat and radial in the BICIREMO. Besides, the boat moves backwards respect to the rower and the BICIREMO moves forwardly.

The fittings of the BICIREMO are mounted on a frame the same as the one of an ordinary bicycle. The frame itself is made of square section rods, but circular section rods can also be utilized.

Brakes are actuated from the steering handles like in any ordinary bicycle.

The weight of the BICIREMO will be, at the most, 20% over the weight of a 28" wheel track bicycle.

To illustrate the advantages roughly commented herein, to which users and experts will be able to add on many others, a preferred example of embodiment is described below, accompanied by non-scale schematic drawings. It is understood that, being it only an example, it is not exclusive and does not limit the scope of the protection of the present invention, but it simply intends to explain and illustrate the basic principle on which it is based.

BRIEF DESCRIPTION OF THE DRAWINGS

FIG. 1: shows a side view of the BICIREMO of the present invention, where the dotted lines indicate the different positions of the steering handles.

FIG. 2: shows a top view of the BICIREMO of the present invention, where the extreme positions of the steering handles and the movement of the seat are indicated by the dotted lines.

FIG. 3: shows a front view of the present invention, where the articulation of the steering handles is clearly seen.

FIG. 4: is a detailed side view which shows the mechanical connection between the steering handles acting as a lever and the pinion which accounts for the back wheel turning.

DESCRIPTION OF THE PREFERRED EMBODIMENTS

In the following description and the accompanying drawings like numbers refer to like parts wherever they occur.

The bicycle driven by alternating rowing movement of the present invention consists of a bicycle which lacks pedals and which utilizes a steering handles-lever 1 to effect locomotion.

This steering handles-lever 1, is pivotally affixed, at a certain distance of its lower end, by means of a transverse axle 2 which allows for an extreme radial movement 1'.

At its lower end, the steering handles-lever 1 is pivotally connected by means of a transverse axle 3, to a connecting -rod 4, which in turn is also pivotally connected, by means of a transverse axle 5, to a toothed rack bar 6, which in turn is joined to a pinion 7, connected by a chain 8 to the pinion 9, associated to the back wheel 10.

Both ends of the steering handles are provided with rotating gantlets to allow for the articulation of the wrists by the BICIREMO "rower".

The sliding seat 11 is mounted onto the upper part of the frame of the BICIREMO. It moves axially and has stroke end stops at both ends.

The upper part of the frame goes beyond the steering handles-lever 1 on the front wheel and bears a footrest 12 on each side.

The constituent elements of the BICIREMO having been described, further information will be provided about:

a) the transverse axle 2, bearing point of the steering handle-lever 1 (rowing) and b) the steering of the BICIREMO, which at that bearing point is articulated with axial movement (rowing), but which behaves as an ordinary bicycle with reference to its rotating movement.

The steering handles-lever 1, is utilized as an oar, acting as an alternating movement or swing-motion lever, but at any given radial point it may be, the BICIREMO "rower" can rotate the steering handle which is associated to the front wheel, as in any ordinary bicycle.

The sliding seat 11 and the footrests 12 are also an important part of the present invention, allowing for the participation of practically all the body in the rowing effort as was previously described.

Finally, it must be emphasized that the alternating axial movement originated by the steering handles-lever 1, is transmitted by the articulation of the transverse axle 3, to the connecting-rod 4, which transmits its movement to the toothed rack bar 6, through the articulation provided by the transverse axle 5.

This toothed rack bar 6, also moves alternatingly and axially, causing a pinion 7 to rotate, which in (preferably) only one sense drives a driving flange, whose rotating movement as in the case of a conventional bicycle, is transmitted by a chain 8 to the pinion 9, this one being associated to the back wheel 10.

In this way, when moving the steering handles-lever 1, the BICIREMO "rower" causes the back wheel 10 to rotate, thus propelling the BICIREMO.

As it has been mentioned, at any inclination angle in which the steering handles 1 may be, the BICIREMO "rower" can rotate it, as in an ordinary bicycle.

The brakes and other fittings of the BICIREMO are the same as those utilized by a conventional bicycle.

A disabled person, unable to use the legs, generally utilizes a wheel chair which is driven by the force that the person applies with the hands, arms and shoulders to a ring associated to the wheels of the chair so that the chair can move.

The purpose of a wheel chair driven by the BICIREMO mechanism already described: steering handles-lever, connecting-rod, toothed rack, gear associated to the driving flange, bicycle chain, pinion associated to the wheels of the chair, etc, is to provide the chair with entertainment for the disabled person.

The steering handles-lever accounts for both the rowing movement which propels the chair and the steering.

The seat can be stationary or with pendular oscillatory motion to match the length of the rowing. A second seat, operating lever, and footrest may be mounted on the bicycle frame in tandem with the first above-mentioned corresponding components such that two persons can row simultaneously.

From the description above and accompanying drawings it is clearly demonstrated that the present invention has constructive and functional advantages and represents a great technological advance over the various related devices known so far.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the following claims:

I claim:

1. A bicycle driven by alternating rowing movement comprising a frame having a rear wheel and a steerable front wheel, a hollow operating lever having a pivot mount on a front portion of said frame for pivotal movement in a vertical plane along the longitudinal axis of said frame, said operating lever having a lower lever arm extending below said pivot mount and a pivotal steering handle on the upper end thereof, means connected to said lower lever arm and said rear wheel for translating the pivotal movement of said operating lever into rotary movement of said rear wheel, a seat slidably mounted on said frame, means operatively connecting said seat to said operating lever for moving said set in response to pivotal movement of said operating lever, a steering shaft within said hollow operating lever and connected to said steering handle and to said steerable front wheel, said steering shaft having an articulated connection at said pivot mount such that steering movement of said steering handle is transmitted to said front wheel throughout the complete pivoting angle of said operating lever.

2. A bicycle as claimed in claim 1 wherein said means for translating comprises a connecting lever having an end thereof pivotally connected to said lower lever arm and a toothed rack at another end thereof, and a pinion gear meshing with said toothed rack and drivingly connected to said rear wheel.

* * * * *